(12) United States Patent
Prissok et al.

(10) Patent No.: US 11,577,486 B2
(45) Date of Patent: Feb. 14, 2023

(54) FLOORINGS PREPARED FROM COMPOSITES COMPRISING EXPANDED THERMOPLASTIC ELASTOMER PARTICLES

(71) Applicant: BASF SE, Ludwigshafen am Rhein (DE)

(72) Inventors: Frank Prissok, Lemfoerde (DE); Zhen Yu Qian, Shanghai (CN); Jiandong Cai, Singapore (SG); Anna Kristin Herbst, Singapore (SG); Xue Dong Li, Guangzhou (CN); Kun Luo, Guangzhou (CN)

(73) Assignee: BASF SE, Ludwigshafen am Rhein (DE)

( * ) Notice: Subject to any disclaimer, the term of this patent is extended or adjusted under 35 U.S.C. 154(b) by 300 days.

(21) Appl. No.: 16/612,039

(22) PCT Filed: May 9, 2018

(86) PCT No.: PCT/EP2018/062029
§ 371 (c)(1),
(2) Date: Nov. 8, 2019

(87) PCT Pub. No.: WO2018/206657
PCT Pub. Date: Nov. 15, 2018

(65) Prior Publication Data
US 2021/0046729 A1    Feb. 18, 2021

(30) Foreign Application Priority Data
May 10, 2017    (WO) ................ PCT/CN2017/083701

(51) Int. Cl.
*B32B 5/16*    (2006.01)
*B32B 3/06*    (2006.01)
(Continued)

(52) U.S. Cl.
CPC ............... *B32B 5/16* (2013.01); *B32B 3/06* (2013.01); *B32B 5/02* (2013.01); *B32B 5/18* (2013.01);
(Continued)

(58) Field of Classification Search
None
See application file for complete search history.

(56) References Cited

U.S. PATENT DOCUMENTS

| | | | |
|---|---|---|---|
| 2010/0047550 A1 | 2/2010 | Prissok et al. | |
| 2012/0009377 A1* | 1/2012 | Dodge, III ............... | B32B 5/02 428/319.3 |

(Continued)

FOREIGN PATENT DOCUMENTS

| | | | |
|---|---|---|---|
| AU | 2003262477 A1 * | 6/2004 | |
| DE | 25 42 452 A1 | 4/1977 | |

(Continued)

OTHER PUBLICATIONS

Lilge, Helmut, Multilayered Element, Apr. 22, 1993, machine translation of DE4134339 (Year: 1993).*

(Continued)

*Primary Examiner* — Chinessa T. Golden
(74) *Attorney, Agent, or Firm* — Grüneberg and Myers PLLC (57) ABSTRACT

The present invention relates to a composite comprising (1) a bottom layer comprising expanded thermoplastic elastomer particles; and (2) a surface layer on the bottom layer, and the use of such composites in flooring surfaces sports, sports hall floorings, swimming pool hall floorings, running tracks, sports facilities, playgrounds, kindergartens, park walkway and pavements.

18 Claims, 4 Drawing Sheets

(51) Int. Cl.
    *B32B 5/02*     (2006.01)
    *B32B 5/18*     (2006.01)
    *B32B 5/24*     (2006.01)
    *B32B 5/30*     (2006.01)
    *B32B 5/32*     (2006.01)
    *B32B 9/02*     (2006.01)
    *B32B 9/04*     (2006.01)
    *B32B 25/04*    (2006.01)
    *B32B 25/10*    (2006.01)
    *B32B 25/12*    (2006.01)
    *B32B 25/14*    (2006.01)
    *B32B 25/16*    (2006.01)
    *C08G 71/04*    (2006.01)

(52) U.S. Cl.
    CPC ............... *B32B 5/245* (2013.01); *B32B 5/30* (2013.01); *B32B 5/32* (2013.01); *B32B 9/02* (2013.01); *B32B 9/046* (2013.01); *B32B 9/048* (2013.01); *B32B 25/045* (2013.01); *B32B 25/047* (2013.01); *B32B 25/10* (2013.01); *B32B 25/12* (2013.01); *B32B 25/14* (2013.01); *B32B 25/16* (2013.01); *C08G 71/04* (2013.01); *B32B 2260/025* (2013.01); *B32B 2264/0221* (2013.01); *B32B 2264/0292* (2013.01); *B32B 2266/025* (2013.01); *B32B 2266/0207* (2013.01); *B32B 2266/0228* (2013.01); *B32B 2266/0257* (2013.01); *B32B 2266/0264* (2013.01); *B32B 2266/0278* (2013.01); *B32B 2266/08* (2013.01); *B32B 2266/12* (2016.11); *B32B 2307/51* (2013.01); *B32B 2419/04* (2013.01)

(56) References Cited

U.S. PATENT DOCUMENTS

| | | |
|---|---|---|
| 2012/0059075 A1 | 3/2012 | Prissok et al. |
| 2012/0297513 A1 | 11/2012 | Prissok et al. |
| 2015/0237823 A1 | 8/2015 | Schmitt et al. |
| 2015/0252163 A1 | 9/2015 | Prissok et al. |

FOREIGN PATENT DOCUMENTS

| | | | | |
|---|---|---|---|---|
| DE | 4134339 A1 | * | 4/1993 | ............... B32B 9/02 |
| WO | WO 94/20568 A1 | | 9/1994 | |
| WO | WO 2007/082838 A1 | | 7/2007 | |

OTHER PUBLICATIONS

International Search Report dated Aug. 17, 2018 in PCT/EP2018/062029 filed May 9, 2018.

* cited by examiner

FLOORINGS PREPARED FROM COMPOSITES COMPRISING EXPANDED THERMOPLASTIC ELASTOMER PARTICLES

TECHNICAL FIELD

The present invention relates to a composite comprising expanded thermoplastic elastomer particles, and the use of such composites in flooring surfaces, sports hall floorings, swimming pool hall floorings, running tracks, sports facilities, playgrounds, kindergartens, park walkway and pavements.

BACKGROUND OF ART

Polyurethanes are nowadays used in many applications because of their broad property profile. Polyurethanes can be used both in compact form and in foamed form. Polyurethanes can, for example, be present in the form of thermosetting elastomers, thermoplastic elastomers, microcellular elastomers, integral foams, flexible foams, rigid foams or semi rigid foams. Further details on this subject may be found in "Kunststoffhandbuch, Volume 7, Polyurethane", Carl Hanser Verlag, 3rd Edition 1993, Chapters 5 to 8 and 10-12.

US2010/0047550A1 discloses the use of a hybrid material comprising a matrix of polyurethane and foamed particles of thermoplastic polyurethane comprised therein as floor covering, bicycle saddles, upholstery and shoe soles.

US2015/0237823A1 describes a stall floorcovering comprising a foam mat comprising expanded thermoplastic polyurethane-bead foam for animals.

It is well known that the dynamic interaction between the athlete and the sports flooring is significant to the performance and safety of the athlete. Therefore, the ability of the surface to reduce force (i.e. force reduction) is important.

It was therefore an object of the present invention to provide floorings having improved force reduction. It was found by the present inventors that the inclusion of expanded thermoplastic elastomer (E-TPE), especially expanded thermoplastic polyurethanes in the floorings is capable to improve the force reduction of floorings.

INVENTION SUMMARY

Thus, the present invention provides a composite, comprising (1) a bottom layer comprising expanded thermoplastic elastomer particles; and (2) a surface layer on the bottom layer.

The present invention also provides use of such composites in flooring surfaces, sports hall floorings, swimming pool hall floorings, running tracks, sports facilities, playgrounds, kindergartens, park walkway and pavements.

EMBODIMENTS

In one embodiment of the invention, a composite is provided, wherein the composite comprises (1) a bottom layer comprising expanded thermoplastic elastomer particles; and (2) a surface layer on the bottom layer.

The bulk densities of the expanded thermoplastic elastomer particles are less than 300 g/l, preferably from 20 g/l to 200 g/l, more preferably from 40 to 160 g/l.

The expanded thermoplastic elastomer particles have a closed cell content more than 90% as measured by customary method (DIN ISO 4590) in the art.

The composites have good force reduction of more than 35%, preferable more than 40%, more preferable from 40% to 60%.

The expanded thermoplastic elastomer particles are generally spherical, and usually have an average diameter of from 0.2 to 20 mm, preferably from 1 to 12 mm, more preferably from 3 to 8 mm. In the case of non-spherical, e.g. ellipsoidal, elongate or cylindrical, particle diameter means the longest dimension.

There is no particular limit for the selection of the expanded thermoplastic elastomers. Generally, any expanded thermoplastic elastomer in the art is suitable for the composites of the present invention. For example, the expanded thermoplastic elastomers can be selected from the group consisting of expanded thermoplastic polyurethane, expanded thermoplastic polyester, expanded thermoplastic polyesterether, expanded thermoplastic polyetherester, expanded thermoplastic polyetheramide, expanded thermoplastic polyolefin copolymer, expanded thermoplastic polyethylenevinylacetate, expanded thermoplastic polyethylenepropylenediene, expanded thermoplastic polypropylene, expanded thermoplastic styrene block copolymer and a mixture thereof. Particularly, preferred expanded thermoplastic elastomer is expanded thermoplastic polyurethane.

Conventional materials in the art can be used in the surface layer. For example, the surface layer can comprise compact (i.e. non-foamed) elastomers, expanded elastomers, or combination thereof. There is no particular limit for the selection of the compact elastomers. Generally, any compact elastomer in the art is suitable for the composites of the invention, such as rubbers. For example, the compact elastomers can be selected from the group consisting of ethylene propylene diene monomer (EPDM) rubber, styrene-butadiene rubber (SBR), polyurethane (PU), ethylene-vinyl acetate (EVA), natural rubber (NR), butadiene rubber (BR), thermoplastic polystyrene (TPS) elastomer, thermoplastic polyolefin (TPO) elastomer, thermoplastic vulcanizates (TPV) elastomer, asphalt, and a mixture thereof.

In one embodiment of the present invention, the surface layer can comprise natural materials, such as cork.

In one embodiment of the present invention, the content of the expanded thermoplastic elastomer particles is in the range from 1.0 wt % to 99.0 wt %, preferably from 3.0 wt % to 50.0 wt % based on the weight of the composite.

Preferably, the ratio of bottom layer to surface layer in the composites is in the range from 1:10 to 10:1 by weight.

In the composites, the expanded thermoplastic elastomer particles can be bonded to one another with an adhesive, for example with a matrix of reactive components.

Preferably, the matrix of reactive components is selected from the group consisting of 1-component or 2-component polyurethane, urea, melamine, formaldehyde, and epoxy polymers. The matrix can be in the form of a foam, a compact elastomeric system or a gel.

In the composites, the expanded thermoplastic elastomer particles can be also thermally-fused to one another by exposure to heat, without using an adhesive.

In one embodiment of the present invention, the expanded thermoplastic elastomer particles can be randomly dispersed into a matrix such as EPDM in the bottom layer of the composites.

For the purposes of the present invention, the expanded thermoplastic polyurethane particles are particularly suitable for preparing the composites. Suitable foamed thermoplastic polyurethane particles (i.e. expanded thermoplastic polyurethane particles (E-TPU)) and production thereof are well known and are disclosed by way of example in WO 94/20568, WO 07/82838, US2015/0237823A1, and US2010/0047550A1, which are incorporated herein by reference.

From the TPUs, it is possible to produce expanded, i.e. foamed, TPU particles, in particular via the suspension or extrusion processes known to the person skilled in the art and described in the literature above. In these processes, the foamed E-TPU particles can be obtained directly or indirectly, i.e. by way of non-foamed expandable TPU particles comprising blowing agent as intermediate; (for the purposes of the present invention, the expressions "expanded TPU (or TPE) particles" and "foamed TPU (or TPE) particles" are used synonymously).

In the suspension process, the TPU in the form of granulated material is heated with water, a suspending agent, and a blowing agent in a closed reactor, to above the softening temperature of the granulated material. The polymer particles here become impregnated with the blowing agent. One possibility then is to cool the hot suspension, whereupon the particles harden with inclusion of the blowing agent, and depressurize the reactor. The resultant expandable particles comprising blowing agent are foamed in a subsequent step via heating to give the expanded particles. In an alternative, the hot suspension can be depressurized suddenly without cooling (explosion expansion process), whereupon the softened particles comprising blowing agent foam immediately to give the expanded particles, see by way of example WO 94/20568.

In the extrusion process, the TPU is mixed in an extruder, with melting, with a blowing agent that is introduced into the extruder. In one possibility, the mixture comprising blowing agent is extruded and granulated under conditions of pressure and of temperature such that the granulated TPU material does not foam (expand), and by way of example this can be achieved by using an underwater pelletizer operated at a water pressure of more than 2 bar. This gives expandable particles which comprise blowing agent and which are foamed via heating in a subsequent step to give the expanded particles. In an alternative, it is also possible to extrude and granulate the mixture without using super atmospheric pressure. In this process, the melt strand foams, and the expanded particles are obtained via granulation.

The expanded TPU particles can be used in the process that is in principle known to the person skilled in the art to produce expanded TPU sheets; (for the purposes of the present invention, the expression "expanded TPU sheets" describes a prefabricated sheet obtainable via adhesive bonding and/or fusion of individual foamed TPU particles). By way of example, the expanded TPU particles can be adhesive-bonded to one another with the aid of an adhesive in continuous or batch processes, for example by using the polyurethane adhesives known to the person skilled in the art. The expanded TPU particles can be fused to one another with exposure to heat in continuous or batch processes, where it is also possible in principle to add adhesives during fusion. In one embodiment, the expanded TPU particles are fused by means of hot air or in particular steam without the use of adhesives.

The expanded TPU particles can be used to produce expanded TPU prefabricated sheets by fusing the E-TPU-particles with exposure to heat in a closed mold, in particular in a molding machine, for example as described in DE-A 25 42 452. For this, the particles are charged to a mold and, after the mold has been closed, hot air, or preferably steam, is introduced, and the particles therefore undergo further expansion and, at temperatures that are preferably between 100° C. and 140° C., are fused to one another to give the expanded TPU sheets.

In one embodiment of the present invention, the composites are prepared by the customary methods in the art, for example, placing the compact elastomers on the expanded TPU sheets by hand lay-up, spraying, spreading, and like.

The composites can also comprise other layers if appropriately, such as middle layer, substrate layer and/or fabric layer.

The composites can be in the form of prefabricated molded parts, which can be produced from the composites by the customary methods in the art. The molded parts comprising expanded TPU particles have low weight and can easily be subjected to mechanical operations via sawing, milling, or punching. Individual molded part can therefore be laid and/or connected to one another relatively easily via a very wide variety of techniques, e.g. via tongue-and-groove connections or dovetail connections. The molded part can be used in flooring surfaces such as sports flooring surfaces, sports hall floorings, swimming pool hall floorings, running tracks, sports facilities, playgrounds, kindergartens, park walkway and pavements.

There is no particular limit for the thickness of the composite or the molded part. The thickness of the composite or the molded part is generally in the range from 5 to 100 mm, preferred in the range from 10 to 50 mm, more preferred in the range from 12 to 30 mm, depending on the specific use. Higher or lower thickness of the molded part is also possible.

All percentages and ratios are mentioned by weight unless otherwise indicated.

EXAMPLES

The present invention is now further illustrated by reference to the following examples, however, the examples are used for the purpose of explanation and not intended to limit the scopes of the present invention.

Test Methods:

Force reduction is measured according to EN 14808: 2005, see IAAF TRACK AND FIELD FACILITIES MANUAL, 2008, p105, section 3.1.3.4;

Thickness is measured according to IAAF TRACK AND FIELD FACILITIES MANUAL, 2008, p105, section 3.1.3.3;

All materials used in the examples are available in the market, and their amounts used are listed in Table 1.

Example 1

Figure 1:
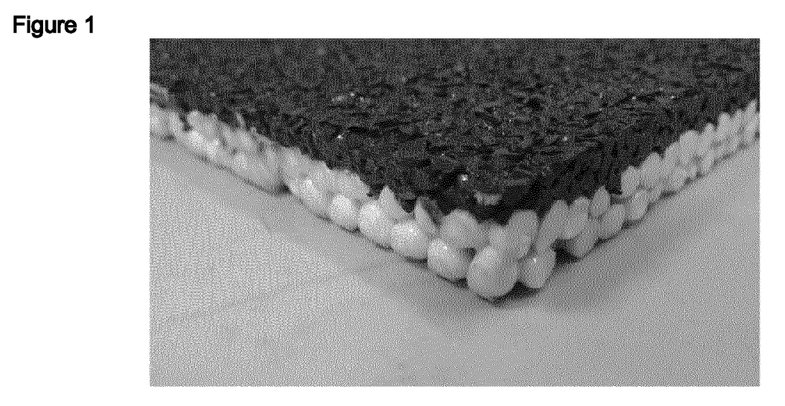
FIG. 1 shows a photograph of composite according to the inventive example 1.

E-TPU particles were bonded to one another by a PU prepolymer as a bottom layer, and the bottom layer were then cured at ambient temperature and moisture for no less than 16 hours. EPDM particles were bonded via hand lay-up on the bottom layer to form a surface layer, and the surface layer was kept at ambient temperature and moisture for final curing.

Example 2

Figure 2:
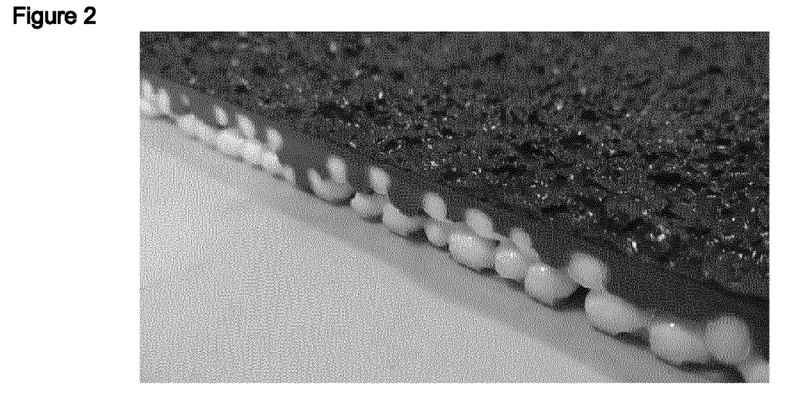
FIG. 2 shows a photograph of composite according to the inventive example 2.

Example 2 was carried out in a manner analogous to Example 1, except that a middle layer made from polyurethane resin was used for sealing purpose and the surface layer was applied by spraying process.

Example 3

Figure 3:
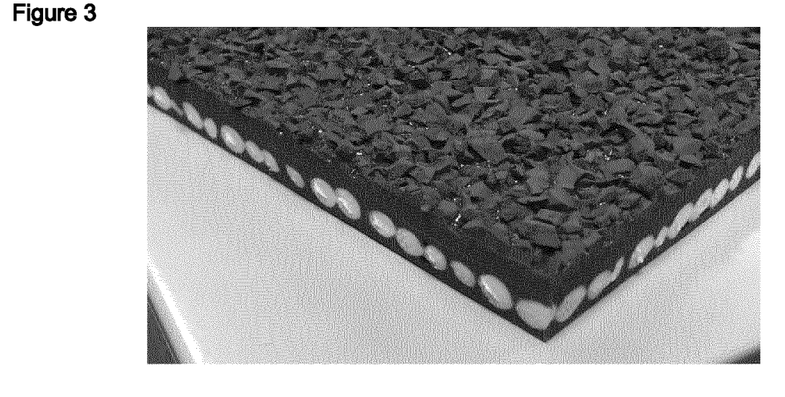
FIG. 3 shows a photograph of composite according to the inventive example 3.

The production of bottom layer was separated into 3 steps. First of all, a 2-component PU sublayer was casted and cured for about 10-20 mins at ambient temperature and moisture to be still viscous but not fully gelled. Then, E-TPU particles are spread evenly on the gel. Afterwards, a third sublayer of 2-component PU was casted. After the bottom layer was cured at ambient condition for no less than 4 hours, EPDM particles and PU prepolymer are sprayed on the bottom layer.

Comparative Example 1 (CE1)

Figure 4:
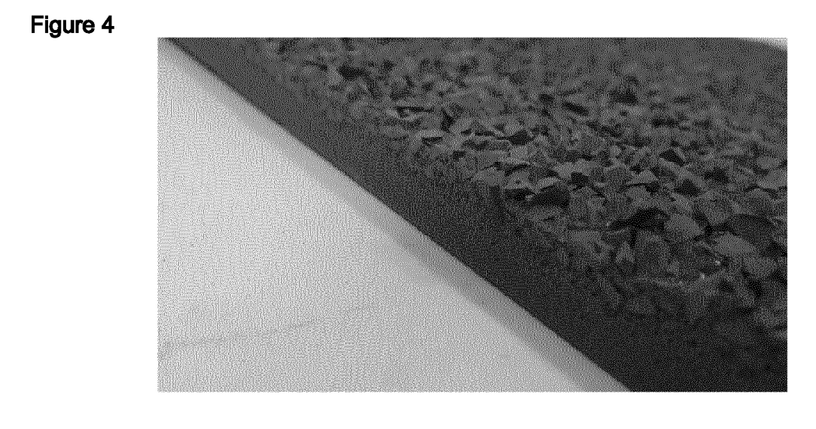
FIG. 4 shows a photograph of composite according to the comparative example 1.

A microfoamed 2-component PU elastomer system was prepared as a bottom layer. After curing, the same microfoamed PU layer was casted. Finally, EPDM particles were spread manually on it and cured.

Example 4

Figure 5:
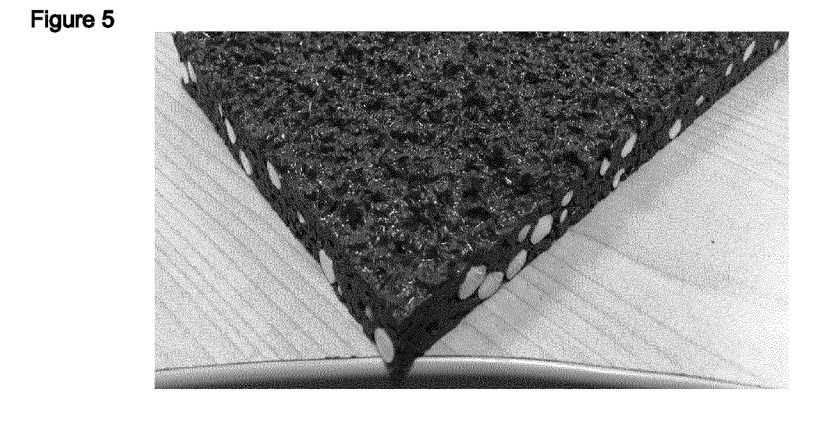
FIG. 5 shows a photograph of composite according to the inventive example 4.

E-TPU particles were randomly mixed with EPDM particles and then bonded with PU prepolymer adhesive as a bottom layer. After cured for no less than 4 hours at ambient temperature and moisture, layer of EPDM particles and PU prepolymer was sprayed on the bottom layer.

Example 5

Figure 6:
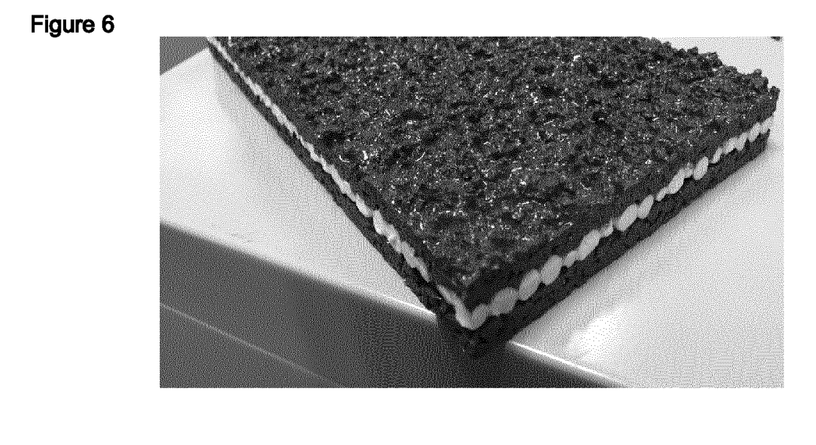
FIG. 6 shows a photograph of composite according to the inventive example 5.

Example 5 was carried out in a manner analogous to Example 4, except that a prefabricated E-TPU layer, rather than randomly embedded E-TPU particles, was laid in the middle of bottom layer. The prefabricated E-TPU layer was prepared in a same method as described in Example 3.

Comparative Example 2 (CE2)

Figure 7:
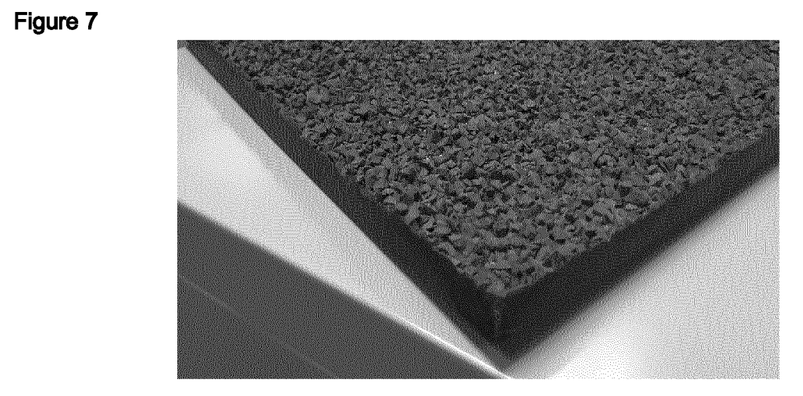
FIG. 7 shows a photograph of composite according to the comparative example 2.

Comparative example 2 was carried out in a manner analogous to comparative example 1, except that a compact 2-component PU elastomer, rather than microfoamed system, was used to prepare the composite.

Comparative Example 3 (CE3)

Figure 8:
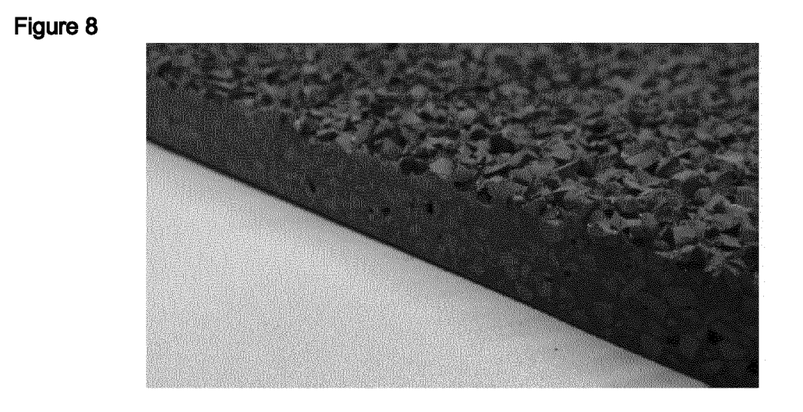
FIG. 8 shows a photograph of composite according to the comparative example 3.

Comparative example 3 was carried out in a manner analogous to comparative example 2, except that the compact 2-component PU elastomer was blended with EPDM particles to prepare the bottom layer.

Comparative Example 4 (CE4)

Figure 9:
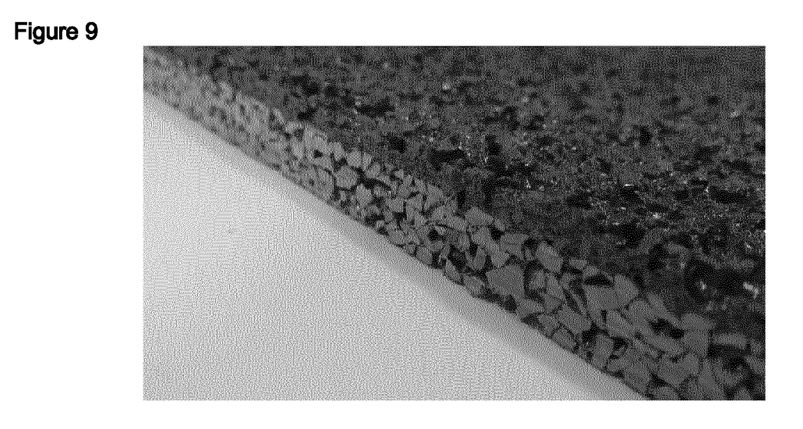
FIG. 9 shows a photograph of composite according to the comparative example 4.

Comparative example 4 was carried out in a manner analogous to example 4, except that no E-TPU particles were used in the bottom layer.

Example 6

Figure 10:
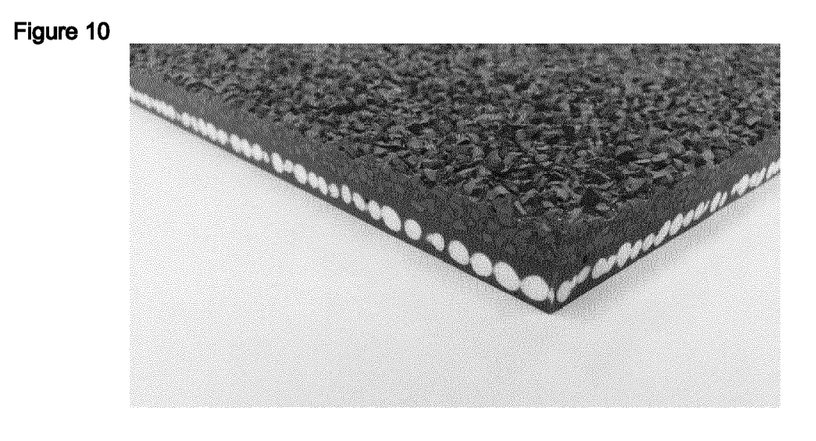
FIG. 10 shows a photograph of composite according to the inventive example 6.

The production of bottom layer was separated into 3 steps. First of all, a 2-component PU sublayer was casted and cured for about 10-20 mins at ambient temperature and moisture to be still viscous but not fully gelled. Then, a prefabricated E-TPU sheet was laid on the surface of the PU sublayer as the second sublayer. Prefabricated E-TPU layer was prepared by adding 40 wt % PU binder (Elastan® CC8004) to E-TPU particles to create a single layer sheet, and then curing for more than 8 hours. Afterwards, a third sublayer of 2-component PU was casted. After the bottom layer was cured at ambient condition for no less than 4 hours, PU elastomer was casted and kept for about 10-20 mins. Finally, EPDM particles were spread and bonded with PU elastomer layer and cured.

TABLE 1

Compositions and properties of the composites from examples and comparative examples

| Sample | Thickness of composite (mm) | Surface layer | Middle Layer | Bottom Layer | Force reduction |
|---|---|---|---|---|---|
| Example 1 | 13 | PU binder (Elastan ® CC8004) (0.8 kg/m$^2$) + EPDM (5.5 kg/m$^2$) (hand lay-up) | N.A. | PU binder (Elastan ® CC8004) (0.48 kg/m$^2$) + ETPU (1.2 kg/m$^2$) | 52.2% |
| Example 2 | 13 | PU Elastomer (Elastocoat ® CC8084/1) (1.8 kg/m$^2$) + EPDM (0.6 kg/m$^2$) (spray) | PU elastomer Elastocoat ® CC8085 (1.5 kg/m$^2$) | PU binder (Elastan ® CC8004) (0.48 kg/m$^2$) + ETPU(1.2 kg/m$^2$) | 51.3% |
| Example 3 | 13 | PU Elastomer (Elastocoat ® CC8084/1) (1.8 kg/m$^2$) + EPDM(0.6 kg/m$^2$) (spread) | N.A. | PU elastomer (Elastocoat ® CC6120) (6 kg/m$^2$) + spread ETPU (0.6 kg/m$^2$) layer | 44.2% |
| CE1 | 14 | Microfoamed PU Elastomer (Modified from Elastocoat ® CC6120 by replacing water absorber with 0.3% water) (3 kg/m$^2$) + EPDM(3 kg/m$^2$) (spread) | N.A. | Microfoamed PU (Modified from Elastocoat ® CC6120 by replacing water absorber with 0.3% water) (5 kg/m$^2$) | 39.3% |

TABLE 1-continued

Compositions and properties of the composites from examples and comparative examples

| Sample | Thickness of composite (mm) | Surface layer | Middle Layer | Bottom Layer | Force reduction |
|---|---|---|---|---|---|
| Example 4 | 13 | PU Elastomer (Elastocoat ® CC8084/1) (1.8 kg/m$^2$) + EPDM (0.6 kg/m$^2$) (spray) | N.A. | PUbinder (Elastan ® CC8004) (1.6 kg/m$^2$) + EPDM (5 kg/m$^2$) + randomly distributed ETPU(0.6 kg/m$^2$) | 41% |
| Example 5 | 13 | PU Elastomer (Elastocoat ® CC8084/1) (1.8 kg/m$^2$) + EPDM(0.6 kg/m$^2$) (spray) | N.A. | PU binder (Elastan ® CC8004) (1.6 kg/m$^2$) + EPDM (5 kg/m$^2$) + prefabricated E-TPU(0.6 kg/m$^2$) layer | 44% |
| CE2 | 14 | PU Elastomer (Elastocoat ® CC6120) (3 kg/m$^2$) + EPDM(3 kg/m$^2$) (spread) | N.A | PU Elastomer (Elastocoat ® CC6120) (9 kg/m$^2$) | 34.3% |
| CE3 | 14 | PU Elastomer (Elastocoat ® CC6120) (3 kg/m$^2$) + EPDM(3 kg/m$^2$) (spread) | N.A. | PU Elastomer (Elastocoat ® CC6120) (6 kg/m$^2$) + EPDM(3 kg/m$^2$) | 33.4% |
| CE4 | 13 | PU Elastomer (Elastocoat ® CC8084/1) (1.8 kg/m$^2$) + EPDM(0.6 kg/m$^2$) (spray) | N.A | PU binder (Elastan ® CC8004) (1.6 kg/m$^2$) + EPDM(8 kg/m$^2$) | 33.9% |
| Example 6 | 14 | PU Elastomer (Elastocoat ® CC6120) (3 kg/m$^2$) + EPDM(3 kg/m$^2$) (spread) | N.A. | PU elastomer (Elastocoat ® CC6120) (6 kg/m$^2$) + prefabricated ETPU (0.6 kg/m$^2$) layer | 39.8% |

Notes:
PU binder: Elastan ® from BASF PU elastomer: Elastocoat ® from BASF (Different PU elastomer or microfoamed PU elastomer systems may be used in different layers, if "microfoamed" or "foamed" is not mentioned, the system is compact. Microfoamed refer to PU systems which are slightly foaming via addition of physical or chemical blowing agent into the system.) E-TPU: Infinergy ® from BASF EPDM: VistalonTM from Exxonmobil The composites of examples 1 and 2 show a very attractive force reduction performance which can protect the injury of human body and joints in abrupt fall. It is high deformability of E-TPU particles that offers a relatively long "collision time", which improves the cushion effect and force reduction.

Compared with comparative example 2 and 3, the composites of inventive example 3 shows a significantly improvement of force reduction, from 34.3% or 33.4% to 44.2%. Although force reduction may also be improved to certain degree in the case of comparative example 1, where the bottom layer is microfoamed via recipe modification, from 34.3% or 33.4% to 39.3%, however, the microfoamed process is strongly influenced by local moisture and temperature during construction, and therefore is more challenging to be practically well controlled. Prefabricated E-TPU sheet between the PU elastomer sublayers is used in the bottom layer in Example 6, the force reduction is also significantly improved. The composites of inventive example 4 and inventive example 5 improve the force reduction by either randomly mixing E-TPU particles or inserting a prefabricated E-TPU sheet into EPDM in the bottom layer, compared with the traditional composite of comparative example 4. Randomly mixing E-TPU particles or inserting a prefabricated E-TPU sheet into PU elastomer can similarly improve the force reduction.

The use of ETPU provides an improved force reduction, but also a more environment friendly solution, which is urgently requested in this traditional application fields. In addition, the addition of E-TPU does not reduce or destroy other properties of the composites, such as deformation, friction, tensile strength, abrasion, and elongation. In certain circumstance, the tensile and elongation properties are even improved.

It will be apparent to those skilled in the art that various modifications and variations can be made in the present invention without departing from the scope or spirit of the present invention. Thus, it is intended that the present invention cover such modifications and variations as come within the scope of the appended claims and their equivalents.

The invention claimed is:

1. A composite, comprising:
   a bottom layer comprising polyurethane and expanded thermoplastic elastomer particles, wherein the bottom layer comprises a middle layer, the middle layer comprising one or more of an expanded thermoplastic polyurethane (E-TPU) sheet, E-TPU particles, or a prefabricated E-TPU layer; and
   a surface layer on the bottom layer, wherein the expanded thermoplastic elastomer particles are dispersed into a matrix of EPDM in the bottom layer of the composite.

2. The composite according to claim 1, wherein the expanded thermoplastic elastomer particles have a bulk density less than 300 g/l.

3. The composite according to claim 2, wherein the expanded thermoplastic elastomer particles have a closed cell content more than 90%.

4. The composite according to claim 1, wherein the composite has a force reduction more than 40%.

5. The composite according to claim 4, wherein the composite has a force reduction of from 40% to 60%.

6. The composite according to claim 1, wherein the expanded thermoplastic elastomer particles have an average diameter of from 0.2 mm and 20 mm.

7. The composite according to claim 6, wherein the expanded thermoplastic elastomer particles have an average diameter of from 1 mm and 12 mm.

8. The composite according to claim 1, wherein an expanded thermoplastic elastomer of the expanded thermoplastic elastomer particles is selected from the group consisting of, expanded thermoplastic polyester, expanded thermoplastic polyesterether, expanded thermoplastic polyetherester, expanded thermoplastic polyetheramide, expanded thermoplastic polyolefin copolymer, expanded thermoplastic polyethylenevinylacetate, expanded thermoplastic polyethylenepropylenediene, expanded thermoplastic poly-propylene, expanded thermoplastic styrene block copolymer and a mixture thereof.

9. The composite according to claim 1, wherein the surface layer comprises compact elastomers, expanded elastomers, or combination thereof.

10. The composite according to claim 9, wherein the surface layer comprises compact elastomers and the compact elastomers are selected from the group consisting of ethylene propylene diene monomer rubber, styrene-butadiene rubber, polyurethane, ethylene vinyl acetate, natural rubber, butadiene rubber, thermoplastic polystyrene elastomer, thermoplastic polyolefin elastomer, thermoplastic vulcanizates elastomer, asphalt, and a mixture thereof.

11. The composite according to claim 1, wherein the surface layer comprises a natural material.

12. The composite according to claim 11, wherein the natural material comprises cork.

13. The composite according to claim 1, wherein the content of the expanded thermoplastic elastomer particles is in the range from 1.0 wt % to 99.0 wt % based on the weight of the composite.

14. The composite according to claim 1, wherein the expanded thermoplastic elastomer particles are bonded to one another optionally with a matrix of reactive components selected from the group consisting of 1-component or 2-component polyurethane, urea, melamine, formaldehyde, and an epoxy polymer.

15. The composite according to claim 14, wherein the matrix is a foam, a compact elastomeric system or a gel.

16. The composite according to claim 1, wherein the composite are in the form of prefabricated molded parts.

17. An article, comprising the composite according to claim 1, wherein the article is selected from the group consisting of a flooring surface, a sports hall flooring, a swimming pool hall flooring, a running track, a sports facility, a playground, a kindergarten, a park walkway and a pavement.

18. The article according to claim 17, wherein the flooring surface is a sports flooring surface.

* * * * *